United States Patent
Tsikonis

(10) Patent No.: US 12,286,032 B2
(45) Date of Patent: Apr. 29, 2025

(54) METHOD FOR THERMAL MANAGEMENT OF FUEL CELLS OF A VEHICLE

(71) Applicant: FPT MOTORENFORSCHUNG AG, Arbon (CH)

(72) Inventor: Leonidas Tsikonis, Arbon (CH)

(73) Assignee: FPT MOTORENFORSCHUNG AG, Arbon (CH)

( * ) Notice: Subject to any disclaimer, the term of this patent is extended or adjusted under 35 U.S.C. 154(b) by 248 days.

(21) Appl. No.: 18/041,548

(22) PCT Filed: Oct. 6, 2021

(86) PCT No.: PCT/IB2021/059158
§ 371 (c)(1),
(2) Date: Feb. 14, 2023

(87) PCT Pub. No.: WO2022/096966
PCT Pub. Date: May 12, 2022

(65) Prior Publication Data
US 2023/0302963 A1    Sep. 28, 2023

(30) Foreign Application Priority Data
Nov. 9, 2020  (IT) .......................... 102020000026747

(51) Int. Cl.
*B60H 1/00* (2006.01)
*B60L 58/33* (2019.01)
(Continued)

(52) U.S. Cl.
CPC .......... *B60L 58/33* (2019.02); *B60H 1/00278* (2013.01); *B60H 1/00899* (2013.01); *H01M 8/04029* (2013.01); *H01M 10/441* (2013.01); *H01M 16/006* (2013.01); *B60H 2001/00307* (2013.01); *H01M 2250/20* (2013.01)

(58) Field of Classification Search
CPC ............ B60H 1/00278; B60H 1/00899; B60H 2001/00307; B60K 11/02; B60K 2001/005; B60L 58/33; F01P 2005/105; F01P 5/02; H01M 10/441; H01M 10/613; H01M 10/625; H01M 10/6567; H01M 10/66; H01M 10/663; H01M 16/006;
(Continued)

(56) References Cited

U.S. PATENT DOCUMENTS

2002/0184908 A1* 12/2002 Brotz ..................... B60H 1/143
  62/198
2009/0078400 A1    3/2009 Tamura et al.

FOREIGN PATENT DOCUMENTS

DE   102018219203 A1   5/2020
EP   1264715 A2        12/2002
EP   3444135 A1        2/2019

* cited by examiner

*Primary Examiner* — Charles J Han
(74) *Attorney, Agent, or Firm* — Bayramoglu Law Offices LLC

(57) ABSTRACT

A method for thermal management of fuel cells of a vehicle is provided, the fuel cells (FCS) being cooled through a main circuit (HTCC) where at least one pump (P, P1) is arranged to circulate a cooling liquid through a radiator (R). The method includes a step of selectively thermally connecting the main circuit to a secondary circuit (LTCC) arranged to cool at least one subsystem of the vehicle, such as the vehicle cabin, and/or batteries arranged to cooperate with the fuel cells (FCS), or other subsystems of the vehicle that require cooling or refrigeration.

6 Claims, 6 Drawing Sheets

(51) Int. Cl.
*H01M 8/04029* (2016.01)
*H01M 10/44* (2006.01)
*H01M 16/00* (2006.01)

(58) Field of Classification Search
CPC ......... H01M 2220/20; H01M 2250/20; H01M 8/04029; Y02E 60/10; Y02E 60/50
See application file for complete search history.

METHOD FOR THERMAL MANAGEMENT OF FUEL CELLS OF A VEHICLE

CROSS REFERENCE TO THE RELATED APPLICATIONS

This application is the national phase entry of International Application No. PCT/IB2021/059158, filed on Oct. 6, 2021, which is based upon and claims priority to Italian Patent Application No. 102020000026747, filed on Nov. 9, 2020, the entire contents of which are incorporated herein by reference.

TECHNICAL FIELD

The present invention relates to the thermal management of fuel cells in the field of automotive.

BACKGROUND

Last years are characterized by conversion trend of traditional combustion engine vehicles into electric ones.

One of the challenges that the automotive industry is facing when working on replacing the conventional powertrain technology (Internal Combustion Engines—ICEs) with fuel cell (FC) powered powertrains, is related to the cooling of the latter. The cooling liquid temperature of the fuel cells is about 70° C., while on the traditional engines it is about 85° C. Since the capacity to dissipate the heat depends on the temperature difference of the cooling liquid with respect to ambient temperature, it derives that with unchanged heat amount to dissipate, the vehicle radiators surfaces must be increased. Such an increase can be significant.

However, increasing significantly the radiator area on a vehicle may be an important challenge. In addition, depending on the vehicle mission, the FC may be subject to premature degradation, due to too low power delivery. The premature degradation of the FC is often avoided by temporarily shutting down the FC, or by diverting energy to the battery, according to a solution found by the applicant. Nevertheless, this second option may not be possible when the battery is full.

Therefore, the thermal management of fuel cells is one of the most relevant challenges for their wide implementation.

SUMMARY

It is the main object of the present invention to provide a thermal management system for fuel cells capable to reduce or overcome the above problems/drawbacks.

The main principle of the invention is to enhance the performance of the fuel cells cooling circuit by decreasing further the temperature of the cooling liquid through a secondary cooling circuit arranged to cool at least one subsystem of the vehicle, such as the vehicle cabin, a refrigeration compartment, if applicable, and/or the batteries and/or other.

In particular, not only the lower working temperature of the secondary cooling circuit is exploited, but also its thermal capacity, increased by means of a low temperature tank arranged in the secondary cooling circuit, hereinafter "secondary circuit".

According to the invention, the fuel cells cooling circuit, hereinafter "main circuit", implements an electrically non-conductive cooling liquid, such as deionized water or deionized water and electrically non-conductive glycol, specifically designed for fuel cells applications, while the secondary circuit implements a second medium, such as water or water and glycol. For this reason the main circuit does not exchange material with the secondary circuit. The thermal energy between main and secondary circuits is exchanged by means of a coupling heat exchanger.

According to a preferred embodiment of the invention, the secondary circuit is cooled by means of a heat exchanger or a heat pump arranged to cool the secondary medium. Suitable circulating means, such as pumps or the like, are arranged to circulate the secondary medium through the coupling heat exchanger and through the cooling subsystems of the vehicle.

The fuel cells operate, most of the time, at partial loads. The secondary circuit can be over dimensioned especially when arranged to cool vehicular batteries.

This means that the contemporaneity probability that both fuel cells and batteries require the maximum cooling capability is generally low. In addition, the presence of the low temperature tank permits to stabilize the working temperature of the secondary circuit and to compensate temporary increased cooling needs of both the secondary and the main circuits.

According to a preferred embodiment of the invention, even the main circuit is provided with a tank, hereinafter called high temperature tank, arranged to increase the thermal capacity and stability of the main circuit. These and further objects are achieved by means of the attached claims, which describe preferred embodiments of the invention, forming an integral part of the present description.

BRIEF DESCRIPTION OF THE DRAWINGS

The invention will become fully clear from the following detailed description, given by way of a mere exemplifying and non limiting example, to be read with reference to the attached drawing figures, wherein.

The same reference numerals and letters in the figures designate the same or functionally equivalent parts.

According to the present invention, the term "second element" does not imply the presence of a "first element", first, second, etc. are used only for improving the clarity of the description and they should not be interpreted in a limiting way.

DETAILED DESCRIPTION OF THE EMBODIMENTS

FIGS. 1-5 disclose three examples of the present invention.

A main circuit HTCC (High temperature cooling circuit) defines at least a main loop where it is included Fuel cells indicated with the label "Fuel Cell System" and at least a radiator R suitable to dissipate heat produced by the fuel cells in the environment. A first pump P circulates a first cooling medium suitable to be implemented in the field of fuel cells cooling.

A secondary circuit LTCC (Low temperature cooling circuit) defines at least a first loop including at least one subsystem indicated with the label "A/C Battery cooling system, etc." and a low temperature tank LTT.

According to the invention, the secondary circuit includes a heat pairing exchanger X1 arranged to couple the main circuit with the secondary circuit.

Preferably, the pairing exchanger X1 is arranged in a second loop of the secondary circuit.

Preferably, the heat pairing exchanger X1 is arranged immediately upstream of the fuel cell system according to the orientation H1 of the first cooling medium circulation in the main circuit. In case the fuel cells are provided of bypass means B, V1, then the three-way valve of the bypass means is between the heat pairing exchanger X1 and the fuel cells.

The secondary circuit LTCC preferably includes a first C1 and a second collector C2. The first collector is arranged immediately upstream of the low temperature tank according to the orientation H2, H3 of the second cooling medium circulation(s), while the second collector is arranged immediately downstream of the low temperature tank. The secondary circuit has a first loop H2 with an optional second pump PA arranged along the second loop to assure the above circulation H2, which includes the subsystems: cabin/battery subsystem and/or others.

The secondary circuit includes also a third loop H3 including the low temperature tank LTT and the above pairing heat exchanger X1 and a third circulation pump PB. The second pump PA and the third pump PB are controlled by considering the operating conditions respectively of the fuel cells and the subsystem(s) to be cooled.

It should be clear that the first cooling medium and second cooling medium can have different physical-chemical properties.

A chiller circuit is coupled to the secondary circuit to cool the second cooling liquid. The chiller circuit schematizes a heat pump including a compressor, evaporator, condenser and throttling valve. Here only a heat exchanger is explicitly disclosed and indicated with X2. This heat exchanger can be the evaporator of the chiller circuit or a heat exchanger coupling the evaporator with the secondary circuit.

Figure 1:
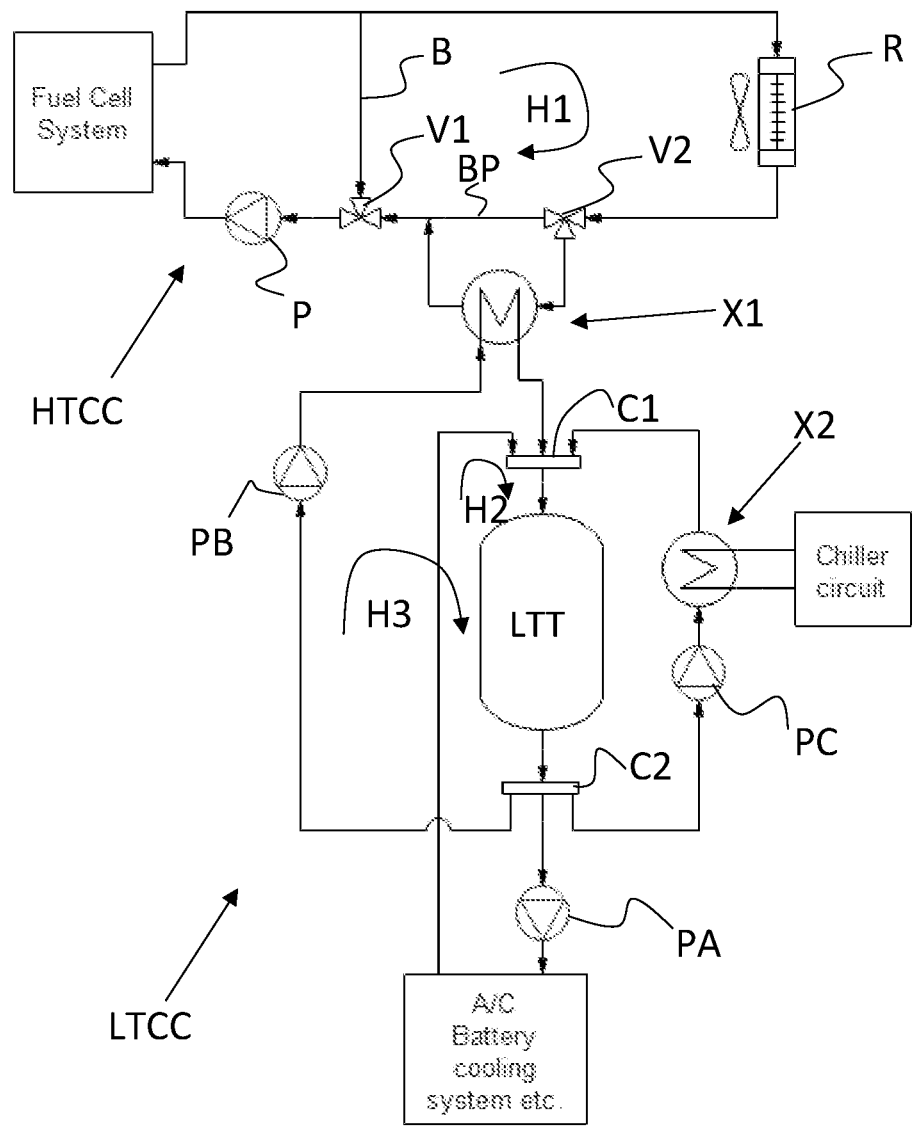
FIGS. 1-3 show three different embodiments of the invention. In particular, starting from the embodiment of FIG. 1, FIG. 2 discloses variations in one first portion of the circuit of FIG. 1, while FIG. 3 discloses variation in one second portion of the circuit of FIG. 1. Therefore, a fourth circuit can be construed as combination of the FIGS. 2 and 3.

According to the embodiment of FIG. 1, the evaporator is arranged on a fourth loop of the secondary circuit. Therefore, this fourth loop includes the low temperature tank LTT the heat exchanger X2 and a fourth pump PC arranged to circulate the second medium also through the fourth loop.

The fluid implemented in the chiller circuit can be R134, R32 or any suitable and admitted thermodynamic fluid.

Figure 3:
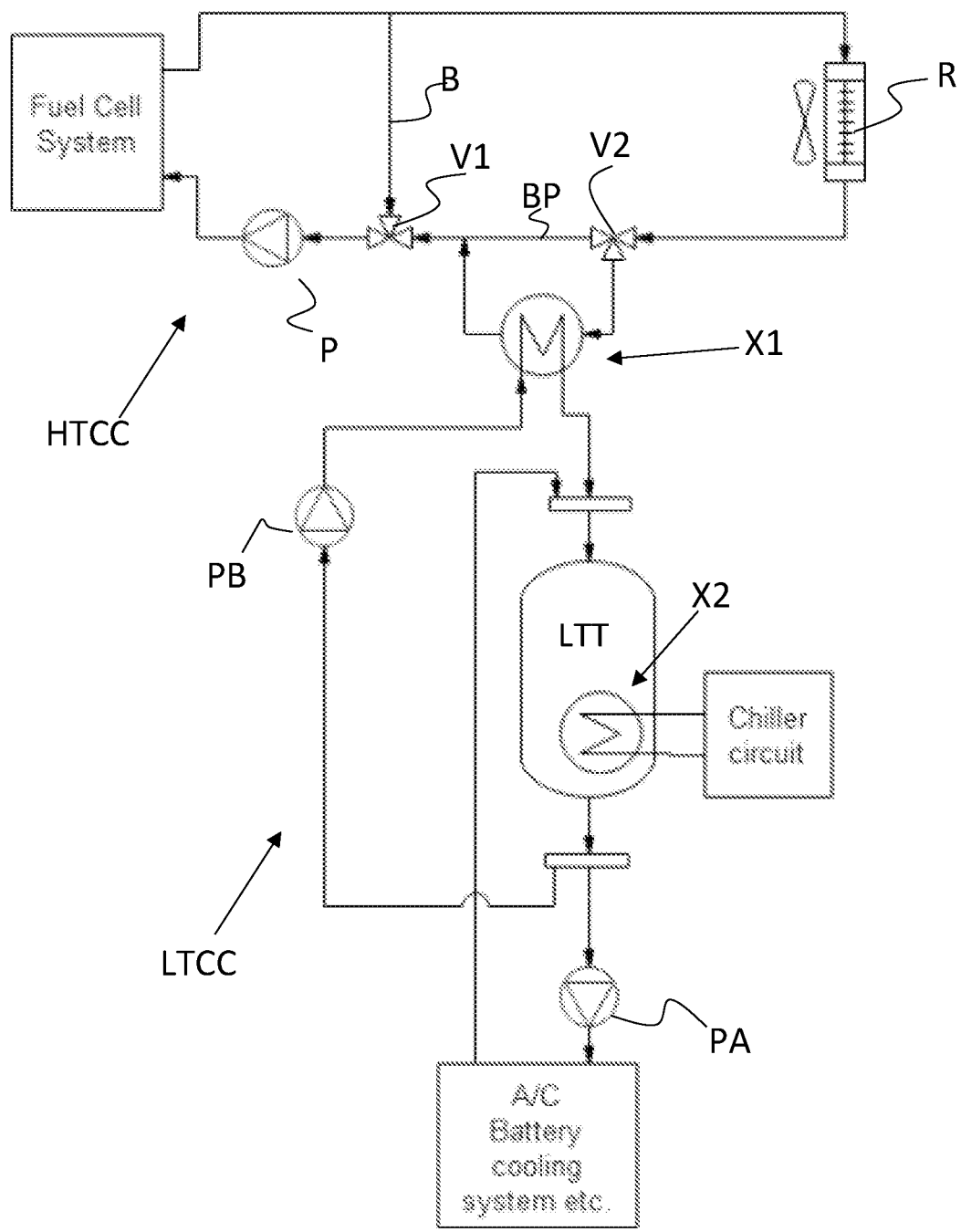

According to the embodiment of FIG. 3, the heat exchanger X2 is arranged inside the low temperature tank, therefore, avoiding the fourth loop and the fourth pump PC. According to the solution of FIG. 3, the heat exchange efficiency of the heat exchanger X2 depends on the activation of the second PA, third PB pumps and the activation of the relevant chiller circuit pump. Therefore, the second pump can be controlled not only as a function of the thermal pairing between main and secondary circuit, but also as a function of the thermal pairing of the chiller circuit with the secondary circuit.

Coming back to the main circuit HTCC, preferably, the main circuit includes also bypass means BP, V2, namely a pipe connection BP and a three-way valve V2 arranged to bypass the heat pairing exchanger X1. The three-way valve can be of the ON/OFF type or can be suitable to meter the mixing of flows. Alternatively, two flow regulators can be implemented instead of the three-way valve.

Preferably, the main circuit includes main bypass means B, V1 arranged to isolate the fuel cell system from the rest of the main circuit. The pump P is arranged in such a way to be always operatively connected with the fuel cell system, in order to better control of the liquid flow in the fuel cell, irrespective of the condition of the three-way valve V1, which selectively isolate the Fuel Cell system from the main circuit HTCC.

Figure 2:
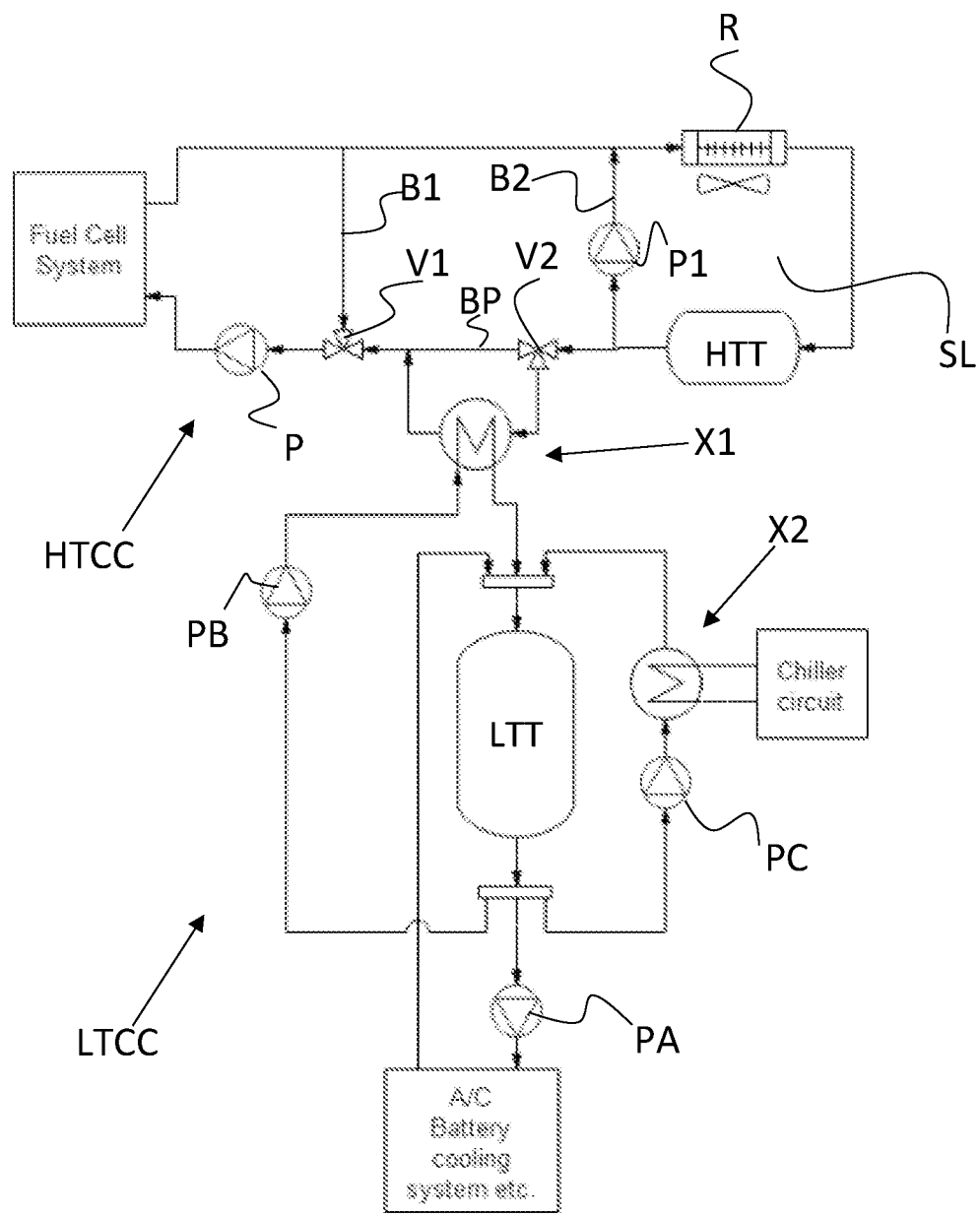

The scheme of FIG. 2 differs from FIG. 1 mainly for the main circuit HTCC, which includes a sub-loop SL including the radiator R, the sub-loop circulation pump P1 and a high temperature tank, which has the scope to stabilize the temperature of the main loop.

The operating principle is as follows:

The Chiller Circuit (RC) is arranged to cool the low temperature tank LTT. The temperature of the secondary medium is always lower to the minimum necessary for any subsystem such as cabin conditioning and/or Battery cooling. This way the LTT serves as a thermal buffer, which is at relatively lower temperature than the operating temperature of the fuel cells;

The main circuit LTCC exploits the cooling of the secondary circuit when the fuel cells operate at high loads where its conventional cooling circuit capacity, is not sufficient, the bypass means BP, V2 are switched in order to pair the main circuit with the secondary circuit;

When the electric energy required by the vehicle as a whole, is lower than the minimum, which the fuel cells are capable to supply, then the excess of electric power capacity is implemented to drive the Chiller circuit by lowering the operating temperature in the secondary circuit. In other words, the lower operating limit of the fuel cells is exploited to store cool useful in opposite, full load, conditions.

On the other side, thanks to the present strategy, the ON/OFF switching of the fuel cells is strongly limited with positive consequence on their lifetime.

In this context, the scheme of FIG. 2 appears to have further advantages because it provides for a higher coolant mass which improve the temperature stability.

It should be considered that the high temperature tank itself improves the performance of the main circuit because it forces the radiator fan to work for a longer time, by smoothening the heat peaks.

In addition, the LTT can be replaced by a static mixer, or it can be a combination of tank and static mixer, in order to ensure the proper mixing of the incoming liquids. The function of static mixer, that is a device, which, without moving parts, mixes two or more fluid streams by exploiting their flows, contributes in the homogenization of the temperatures in the LTT and thus the performance of the cooling system. This is of particular importance if no collector C1 is implemented.

It should be clear that, according to the circumstances, between the chiller circuit and the secondary circuit a further intermediate exchange circuit can be provided or, alternatively, the heat exchanger X2 can be the evaporator of the chiller circuit.

According to another embodiment of the invention, not disclosed in the figures, starting from the scheme of FIG. 2, the high temperature tank HTT can include relating bypass means. This aspect could be relevant after full load peaks, in order to reduce the thermal mass to be refreshed by means of the radiator R and the secondary circuit.

Figure 4:
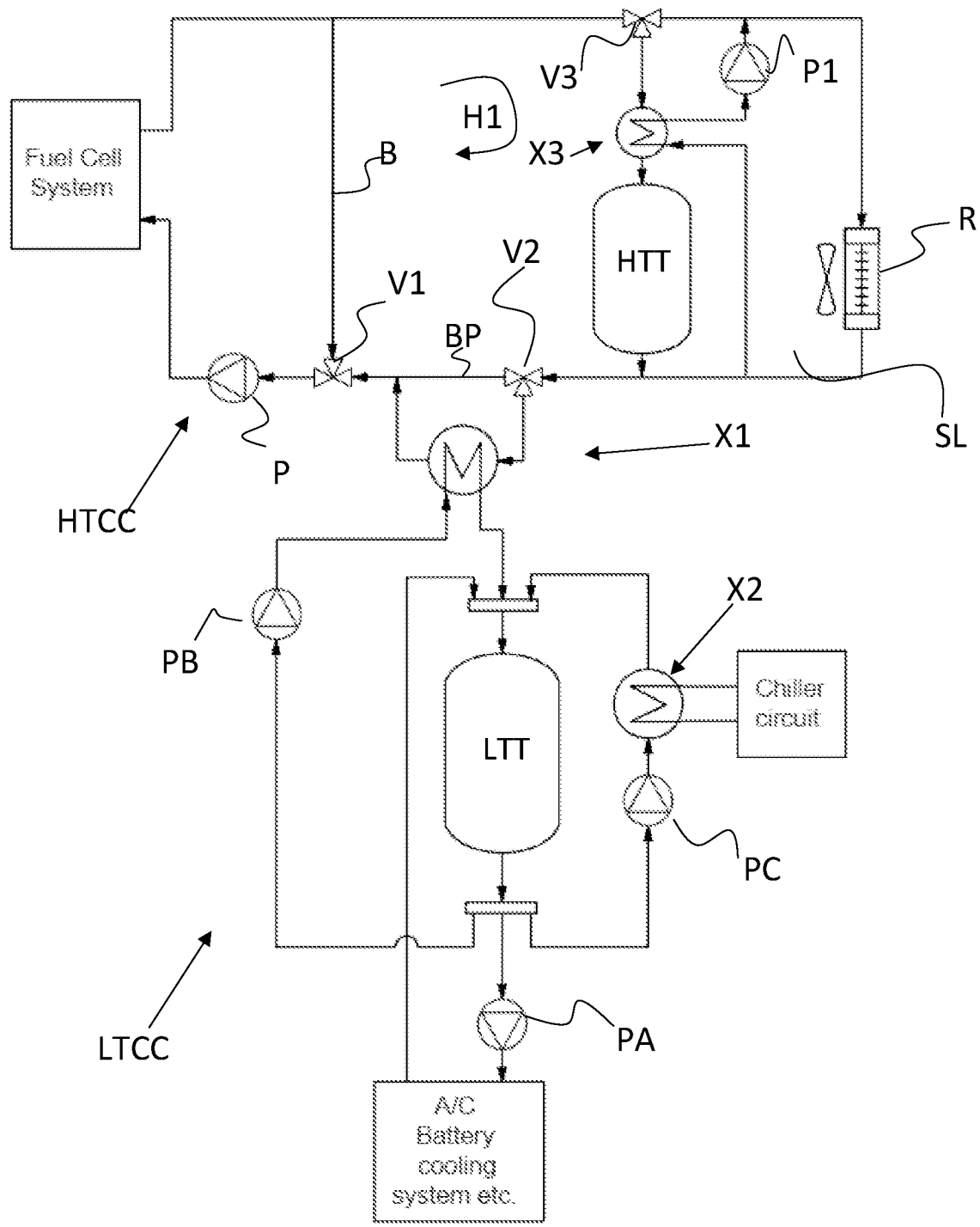
FIGS. 4 and 5 disclose further embodiments based on the high temperature tank of FIG. 2, FIG. 6 schematizes an electric vehicle supplied by fuel cells and batteries.

FIG. 4 discloses another embodiment of the invention substantially based on the presence of the high temperature tank HTT as the solution of FIG. 2.

Here the high temperature tank HTT, the fuel cell system and the radiator R are arranged on parallel branches.

As on previous figures
fuel cell system can be bypassed through bypass means B, V1,
The main circuit can be paired to the secondary cooling circuit through the bypass means BP, V2,
The high temperature tank can be connected or disconnected from the main circuit due to a further three-way valve V3.

In particular, when the three-way valve V3 connects the high temperature tank to the main circuit the flow pumped by the pump P partly crosses the radiator and partly the high temperature tank. A further heat exchanger X3 is arranged in series to the high temperature tank on a same branch, wherein said further heat exchanger X3 is partly in series with the high temperature tank and partly in series with a further pump P1 arranged on a branch which defines a sub-circuit SL with the radiator.

Therefore, the heat exchanger X3 is of the liquid/liquid type.

This configuration is useful because it permits to define two independent loops managed by the pumps P and P1. In this way, when the cooling effect of the radiator is not needed to cool the fuel cell system, the heat previously accumulated in the high temperature tank is dissipated in the ambient by the radiator. In other words, the control of the pumps P and P1 permits to prioritize the cooling of the fuel cell system, to exploit an eventual lower temperature of the liquid in the high temperature tank in case of temperature peaks and to dissipate excess of heat accumulated when the fuel cell system heat production is relatively low.

Figure 5:
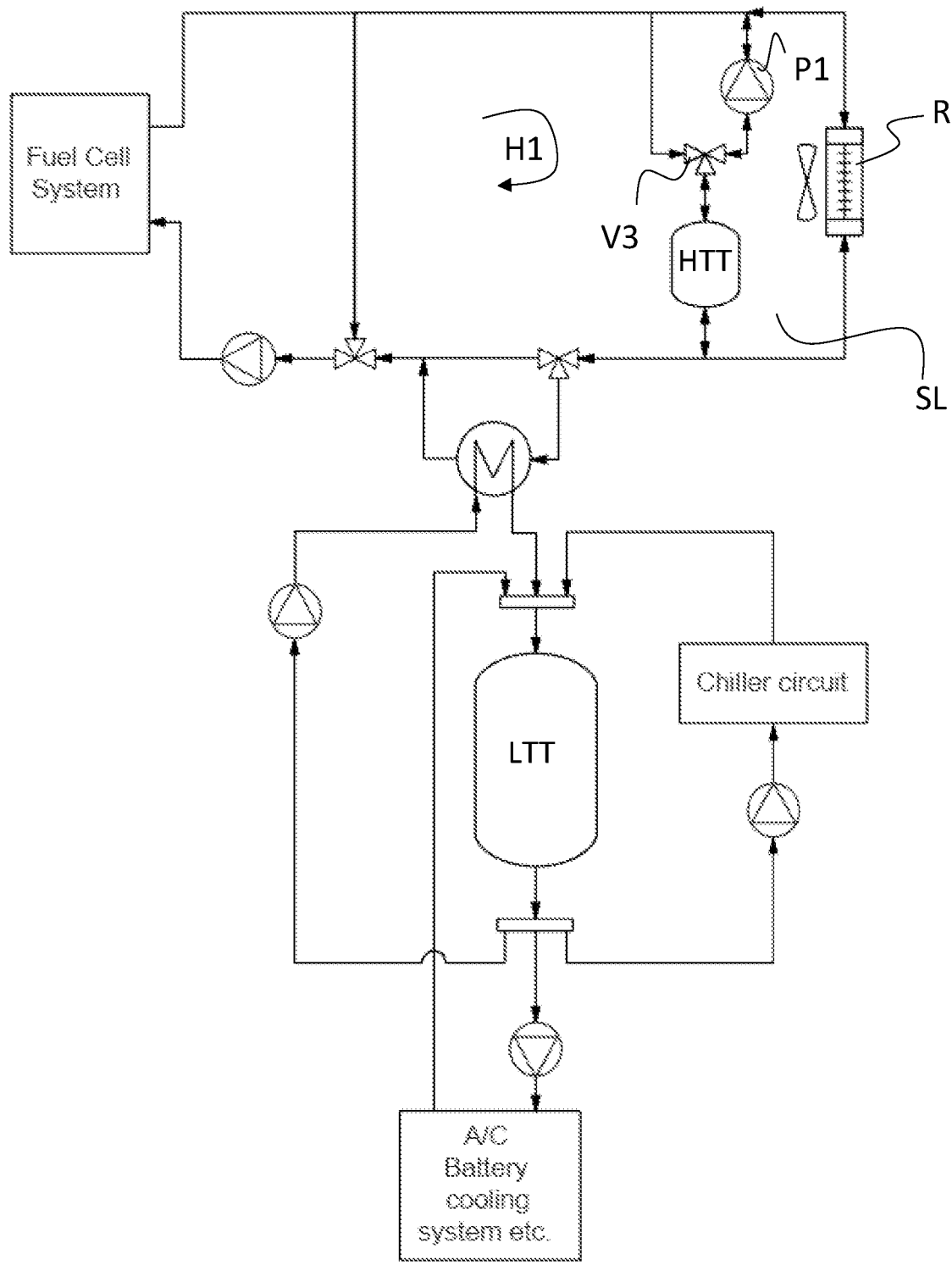
Figure 6:
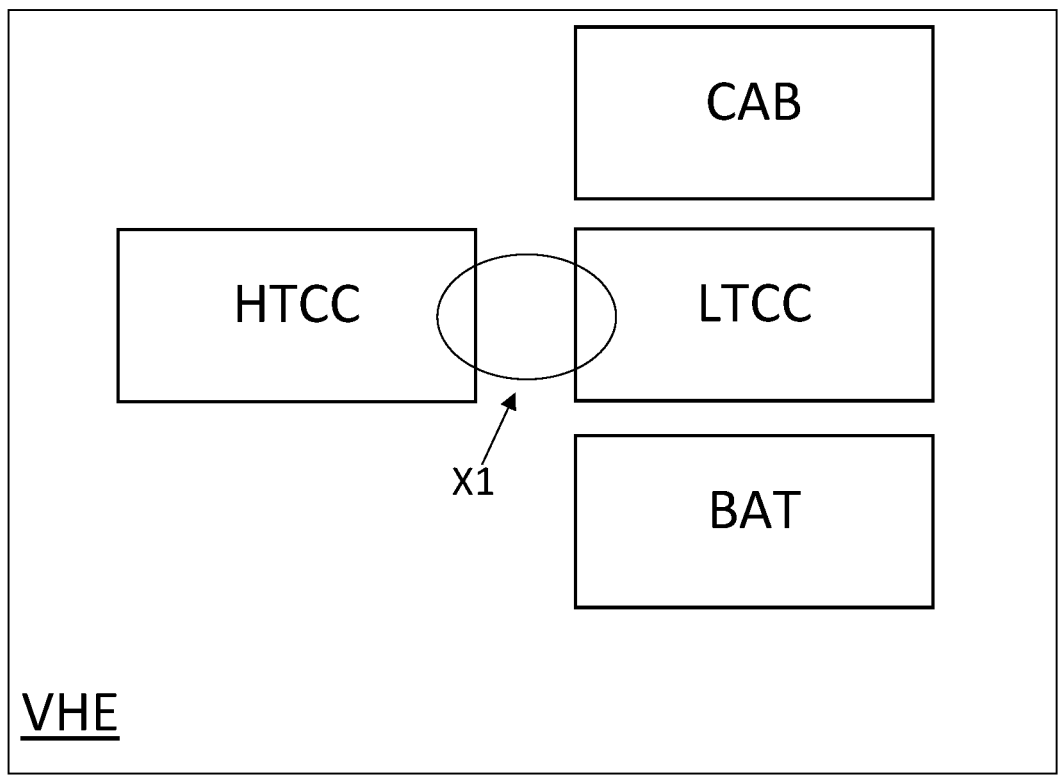

FIG. 5 discloses a further embodiment where the secondary circuit LTCC can be any of the example of the FIGS. 1-4, where the differences are on the main circuit. Here, the high temperature tank is arranged in parallel to the radiator R with bypass means V3 arranged to achieve a first configuration where the radiator and the high temperature tank are fluidly connected to the main circuit, a second configuration where the high temperature tank is fluidly disconnected from the main circuit while the radiator is fluidly connected with the main circuit, and a third configuration where both the high temperature tank and the radiator are disconnected from the main circuit, defining a sub-circuit (SL) where a further pump (P1) is arranged to circulate cooling liquid only in the sub-circuit. The pump P1 may be operated in two flow directions.

Thanks to the present embodiment of the invention, a limit in the fuel cell technology is exploited to reduce the exchange surface of the radiator of the main circuit, such that the technological limitation is paired synergistically with the chiller circuit operation.

It is clear that the low temperature tank LTT is suitably thermally insulated in order not to "disperse the cool" accumulated.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

This invention can be implemented advantageously in a computer program comprising program code means for performing one or more steps of such method, when such program is run on a computer. For this reason, the patent shall also cover such computer program and the computer-readable medium that comprises a recorded message, such computer-readable medium comprising the program code means for performing one or more steps of such method, when such program is run on a computer.

Many changes, modifications, variations and other uses and applications of the subject invention will become apparent to those skilled in the art after considering the specification and the accompanying drawings, which disclose preferred embodiments thereof as described in the appended claims.

The features disclosed in the prior art background are introduced only in order to better understand the invention and not as a declaration about the existence of known prior art. In addition, said features define the context of the present invention, thus such features shall be considered in common with the detailed description.

Further implementation details will not be described, as the man skilled in the art is able to carry out the invention starting from the teaching of the above description.

What is claimed is:

1. A system for thermal management of fuel cells (FCS) of a vehicle, the system comprising:
    a main circuit (HTCC) comprising a radiator (R) and at least one pump (P, P1) configured to circulate a cooling liquid through the radiator (R) and the fuel cells,
    a secondary circuit (LTCC) arranged to cool a subsystem of the vehicle, wherein the subsystem arranged to cooperate with the fuel cells (FCS), wherein the secondary circuit comprises a secondary circuit tank (LTT) cooled directly or indirectly by a chiller circuit (Chiller Circuit), wherein the chiller circuit comprises a heat pump supplied by the fuel cells,
    a heat pairing exchanger (X1) arranged to couple the main circuit with the secondary circuit, and
    a first bypass means (BP, V2) arranged to selectively thermally connect/disconnect the main circuit from the secondary circuit.

2. The system according to claim 1, wherein the subsystem comprises vehicle cabin cooling.

3. The system according to claim 2, wherein the subsystem further comprises battery cooling.

4. The system according to claim 1, wherein the secondary circuit comprises:
    a first loop (H2) comprising a first secondary circuit tank, the at least one subsystem comprises at least one second circulation pump (PA),
    a second loop (H3) comprising a second secondary circuit tank, the heat pairing exchanger (X1) and a third circulation pump (PB).

5. The system according to claim 1, wherein the main circuit comprises a primary circuit tank (HTT), wherein
    the primary circuit tank is arranged in series to the radiator (R) with a further pump (P1) arranged to define a sub-circuit (SL) comprising the radiator, the primary circuit tank and the further pump (P1); or
    the primary circuit tank is arranged in parallel to the radiator (R) with a relating bypass means (V3) to fluidly disconnect the primary circuit tank from the main circuit, and a further heat exchanger (X3) arranged in series to the primary circuit tank on a same branch of the primary circuit tank, wherein the further heat exchanger (X3) is, on one a first side, in series with the primary circuit tank and, on a second side, in series with a further pump (P1) arranged on a branch which defines a sub-circuit (SL) with the radiator; or the primary circuit tank is arranged in parallel to the radiator (R), provided with bypass means (V3) arranged to achieve a first configuration where the radiator and the primary circuit tank are fluidly connected to the main circuit, a second configuration where the primary circuit tank is fluidly disconnected from the main circuit while the radiator is fluidly connected with the main circuit, and a third configuration where the primary circuit tank and the radiator are disconnected from the main circuit, defining a sub-circuit (SL) where a further pump (P1) is arranged to circulate cooling liquid only in the sub-circuit.

6. The system according to claim 1, wherein the main circuit comprises a primary circuit tank (HTT), wherein the primary circuit tank is arranged in series to the radiator (R) with a further pump (P1) arranged to define a sub-circuit (SL) comprising the radiator, the primary circuit tank and the further pump (P1); or the primary circuit tank is arranged in parallel to the radiator (R) with a relating bypass means (V3) to fluidly disconnect the primary circuit tank from the main circuit, and a further heat exchanger (X3) arranged in series to the primary circuit tank on a same branch of the primary circuit tank, wherein the further heat exchanger (X3) is, on a first side, in series with the primary circuit tank and, on a second side, in series with a further pump (P1) arranged on a branch which defines a sub-circuit (SL) with the radiator; or the primary circuit tank is arranged in parallel to the radiator (R), provided with bypass means (V3) arranged to achieve a first configuration where the radiator and the primary circuit tank are fluidly connected to the main circuit, a second configuration where the primary circuit tank is fluidly disconnected from the main circuit while the radiator is fluidly connected with the main circuit, and a third configuration where the primary circuit tank and the radiator are disconnected from the main circuit, defining a sub-circuit (SL) where a further pump (P1) is arranged to circulate cooling liquid only in the sub-circuit.

* * * * *